United States Patent Office 3,205,265
Patented Sept. 7, 1965

3,205,265
PROCESS FOR THE PRODUCTION OF DIPHENYLAMINE
Harry Danziger and Adolf Kersting, Krefeld-Bockum, Germany, assignors to Farbenfabriken Bayer Aktiengesellschaft, Leverkusen, Germany, a German corporation
No Drawing. Filed Mar. 16, 1962, Ser. No. 180,338
Claims priority, application Germany, Mar. 23, 1961, F 33,490
3 Claims. (Cl. 260—576)

The present invention is concerned with a new and improved process for the production of diphenylamine from aniline.

It is known to produce diphenylamine from aniline at elevated temperatures under pressure and with the removal of the ammonia split off, the reaction being carried out in the liquid phase and in the presence of catalysts, namely halides, such as ammonium chloride, zinc chloride, cadmium chloride, copper chloride, mercury chloride or iodide, aluminum chloride, antimony trichloride, managanese chloride, cobalt chloride, iron chloride, tin chloride and boron fluoride, or halogens, particularly iodine or compounds splitting off iodine.

The present invention provides a process for the production of diphenylamine from aniline in the liquid phase at elevated temperatures, for instance, from about 250 to about 400° C., under pressure, for instance, from about 10 to about 30 atmospheres, and with the removal of ammonia split off, in which process the reactants are maintained in the liquid phase and reaction is catalyzed by a halogen and an oxygen-containing compound of phosphorus.

Surprisingly, we have found that the corrosion of the material from which the reaction vessels are constructed is thereby very considerably reduced and, at the same time, the conversion of aniline to diphenylamine is considerably accelerated.

Thus, for example, the loss of weight of test strips or coupons of chrome-nickel steel in boiling aniline containing 1.6 percent by weight of a halogen amounts, in the case of chlorine, to about 340; in the case of bromine, to about 109; and in the case of iodine, to about 50 g./m.$^2$/day, whereas with boiling aniline containing 1.6 percent by weight of bromine and 1.6 percent by weight of phosphoric acid, the loss of weight amounted to only 0.5 g./m.$^2$/day.

The acceleration of the reaction can be seen from the following summary:

The tests were each carried out in a 5-liter autoclave provided with a cooler and containing 3000 grams of aniline. The aniline together with the following specified additives was heated for 10 hours to 360° C. and the pressure maintained at 25 atmospheres by the release of the liberated ammonia.

| Additive | | Conversion, percent |
|---|---|---|
| NH$_4$Cl | 0.5% | 10 |
| | 1.0% | 25 |
| CuCl$_2$ | 0.2% | 5–12 |
| FeCl$_3$ | 0.2% | 5–12 |
| AlCl$_3$ | 0.2% | 5–12 |
| BF$_3$ | 0.2% | 10 |
| Cl$_2$ | 0.16%+H$_3$PO$_4$ (85%) 0.17% | 25 |
| Br$_2$ | 0.17%+H$_3$PO$_4$ (85%) 0.11% | 23 |
| Br$_2$ | 0.17%+H$_3$PO$_4$ (85%) 0.17% | 29 |
| Br$_2$ | 0.17%+H$_3$PO$_4$ (85%) 0.23% | 32 |
| Br$_2$ | 0.17%+H$_3$PO$_4$ (85%) 0.46% | 30 |
| Br$_2$ | 0.17%+P$_2$O$_5$ 0.13% | 35 |
| Br$_2$ | 0.17%+BPO$_4$ 0.21% | 36 |
| I$_2$ | 0.20%+P$_2$O$_5$ 0.17% | 25 |

As oxygen-containing compounds of phosphorus, there may be used, for example, phosphorus trioxide, phosphorus pentaoxide, phosphorous acid, phosphoric acid and boron phosphate, most of which are represented by formulae in the foregoing table. Halogens which may be used include not only chlorine and iodine, but also bromine.

In general, it is sufficient to use the halogen and oxygen-containing compound of phosphorus in amounts between about 0.1 and about 0.5 percent, while the weight for weight ratio between the halogen and phosphorus compound is preferably between about 1:0.5 and about 1:2.

We claim:

1. In a process for the production of diphenylamine by heating aniline under pressure in the liquid phase, the improvement which comprises effecting the reaction in the presence of a catalyst consisting of a mixture of a halogen of the group consisting of chlorine, bromine and iodine, and an oxygen-containing phosphorus compound of the group consisting of phosphorus trioxide, phosphorus pentoxide, phosphorous acid, phosphoric acid, and boron phosphate in a ratio between approximately 0.5 and approximately 2 parts by weight of the phosphorus compound to each part by weight of the halogen and in an amount between approximately 0.1 and approximately 0.5 percent by weight of the aniline.

2. A process for the production of diphenylamine which comprises heating aniline in the liquid phase at a temperature between approximately 250 and approximately 400° C. and a pressure between approximately 10 and approximately 30 atmospheres in the presence of a mixture of a halogen of the group consisting of chlorine, bromine, and iodine, and an oxygen-containing compound of phosphorus of the group consisting of phosphorus trioxide, phosphorus pentoxide, phosphorous acid, phosphoric acid, and boron phosphate in a ratio between approximately 0.5 to approximately 2 parts by weight of the phosphorus compound to each part by weight of the halogen and in an amount between approximately 0.1 and approximately 0.5 percent by weight of the aniline while releasing the ammonia formed in the reaction, and subsequently recovering the diphenylamine thus produced.

3. A process as defined in claim 2 in which the halogen is bromine.

References Cited by the Examiner

UNITED STATES PATENTS

| 1,314,538 | 9/19 | Rogers | 260—576 |
| 1,392,942 | 10/21 | Houlehan | 260—576 |
| 1,422,494 | 7/22 | Tanberg | 260—576 |
| 1,449,423 | 3/23 | Lowy et al. | 260—581 |
| 1,549,136 | 8/25 | Lachman | 260—576 |
| 2,038,574 | 4/36 | Kranz | 260—576 |
| 2,824,137 | 2/58 | Morris | 260—576 |
| 2,968,676 | 1/61 | Potter et al. | 260—576 |

OTHER REFERENCES

German application No. 1,055,540, Kersting et al., printed April 23, 1959 (Kl. 12Q5).

CHARLES B. PARKER, *Primary Examiner.*